(12) United States Patent
Tan et al.

(10) Patent No.: US 11,186,766 B2
(45) Date of Patent: Nov. 30, 2021

(54) INTELLIGENT WATER-CONTROL AND GAS-DIVERSION PARTICLE FOR WATER-GAS RESERVOIRS AND PREPARATION METHOD THEREOF

(71) Applicant: SOUTHWEST PETROLEUM UNIVERSITY, Chengdu (CN)

(72) Inventors: Xiaohua Tan, Chengdu (CN); Hao Yang, Chengdu (CN); Xiaoping Li, Chengdu (CN); Honglin Lu, Chengdu (CN); Lei Ding, Chengdu (CN); Yilong Li, Chengdu (CN)

(73) Assignee: SOUTHWEST PETROLEUM UNIVERSITY, Chengdu (CN)

( * ) Notice: Subject to any disclaimer, the term of this patent is extended or adjusted under 35 U.S.C. 154(b) by 0 days.

(21) Appl. No.: 16/964,604

(22) PCT Filed: Dec. 12, 2019

(86) PCT No.: PCT/CN2019/124805
§ 371 (c)(1),
(2) Date: Jul. 24, 2020

(87) PCT Pub. No.: WO2021/103155
PCT Pub. Date: Jun. 3, 2021

(65) Prior Publication Data
US 2021/0301196 A1 Sep. 30, 2021

(30) Foreign Application Priority Data
Nov. 29, 2019 (CN) .......................... 201911199997.7

(51) Int. Cl.
*C09K 8/92* (2006.01)
*C09K 8/80* (2006.01)

(52) U.S. Cl.
CPC ............... *C09K 8/805* (2013.01); *C09K 8/92* (2013.01)

(58) Field of Classification Search
CPC .................................. C09K 8/805; C09K 8/92
USPC ..................................................... 166/280.2
See application file for complete search history.

(56) References Cited

U.S. PATENT DOCUMENTS

| 8,852,682 B2 * | 10/2014 | Sinclair | ................. C09K 8/805 427/212 |
| 2007/0036977 A1 * | 2/2007 | Sinclair | ................. C09K 8/805 428/403 |
| 2017/0198210 A1 * | 7/2017 | Gupta | ..................... E21B 43/26 |

* cited by examiner

*Primary Examiner* — Crystal J Miller
*Assistant Examiner* — Ashish K Varma

(57) ABSTRACT

The invention discloses an intelligent water-control and gas-diversion particle for water-gas reservoirs and preparation method and application thereof, comprising core support layer with barbs, expandable water shutoff layer, water discharge and gas diversion layer, migration protection layer and suspension lift layer; the expandable water shutoff layer is wrapped on the outer surface of the core support layer and the root of the barb; the water discharge and gas diversion layer is wrapped on the outer surfaces of the expandable water shutoff layer and the barbs; the migration protection layer is wrapped on the outer surface of the water discharge and gas diversion layer; the outer surface of the migration protection layer forms a sphere; the suspension lift layer is wrapped on the outer surface of the migration protection layer.

9 Claims, 2 Drawing Sheets

INTELLIGENT WATER-CONTROL AND GAS-DIVERSION PARTICLE FOR WATER-GAS RESERVOIRS AND PREPARATION METHOD THEREOF

TECHNICAL FIELD

The present invention relates to an intelligent water-control and gas-diversion particle for water-gas reservoirs and preparation method and application thereof, belonging to the technical field of oil and gas exploitation.

DESCRIPTION OF PRIOR ART

In the process of oil and gas exploitation, especially in the field of unconventional oil and gas exploitation, fracturing technology has become an important means for stimulation and recovery efficiency improvement, and fracturing proppant is the key factor to determine the fracturing effect. After the formation is fractured, in order to keep the fractures open and make the fluid flow smoothly, the proppant is usually delivered with the fracturing fluid into fractures to prevent the fracture from closing to ensure the high diversion capacity of the fractures.

At present, according to different processing techniques, the widely used fracturing proppant can be divided into three types: quartz sand, ceramsite and pre-coated proppant. Quartz sand has a low strength, so it may be broken up a lot when it is used in formations under medium to high closure pressure, which will block the pore throats, causing a significant decrease in the diversion capacity of fractures and limiting the applicability of quartz sand in the formation. Ceramsite proppant has a better pressure resistance than quartz sand but a higher cost due to its high relative density and high requirements for fracturing fluid and pumping conditions, so its application is severely limited. As for pre-coated proppant, appropriate framework and coated layer are selected according to the formation conditions, which can solve the problems of proppant transportation and backflow and effectively reduce the damage of proppant backflow to the reservoir and wellbore. Therefore, pre-coated proppant is a kind of proppant that has been studied more at present. The published pre-coated proppant studies and the literature related to the present application include: "Proppant backflow control system and control method based on magnetic proppant" (Application No.: 201310223022.X, Publication No.: CN103266877B), "A oil-soluble water viscous proppant for water shutoff and fracturing and preparation method thereof (Application No.: 201811630120.4), "A preparation method of superhydrophobic pre-coated proppant for oil and gas well fracturing" (Application No.: 201410716564.5, Publication No.: CN104449657B) and "A self-suspension proppant for natural water fracturing" (Application No.: 201410123724.5, Publication No.: CN104946233B), which are all Chinese patents. They only address the problems of proppant transportation and backflow, but do not solve the problems of water discharge, diversion and water outflow.

SUMMARY OF THE INVENTION

In view of the above problems, the present invention mainly overcomes the shortcomings in the prior art, and proposes an intelligent water-control and gas-diversion particle for gas reservoir with aquifer and preparation method and application thereof. The invention not only solves the problem of proppant transportation and backflow in the fracturing process, has a significant effect on improving the water drainage and diversion capacity in the early and middle stages of exploitation of the oil and gas reservoirs and controlling the water outflow in the later stage.

The technical solution provided by the present invention to solve the above technical problems is that an intelligent water-control and gas-diversion particle for water-gas reservoirs comprises core support layer with barbs, expandable water shutoff layer, water discharge and gas diversion layer, migration protection layer and suspension lift layer. The expandable water shutoff layer is wrapped on the outer surface of the core support layer and the root of the barb. The water discharge and gas diversion layer is wrapped on the outer surfaces of the expandable water shutoff layer and the barbs. The migration protection layer is wrapped on the outer surface of the water discharge and gas diversion layer. The outer surface of the migration protection layer forms a sphere. The suspension lift layer is wrapped on the outer surface of the migration protection layer.

All the layers have such functions as backflow prevention, intelligent water shutoff, water and fluid drainage, migration protection and self-suspension from the inside to the outside.

Further, the core support layer (1) is composed of the following ingredients by weight: 65% to 70% of bauxite, 12% to 15% of silicon oxide, 10% to 13% of iron oxide, 3% to 5% of titanium oxide, and 2 to 4% of alumina.

The core support layer is prepared by the more mature solid-phase sintering method through grinding, batching, granulation, sieving, sintering and other steps. The core support layer has a compressive strength of 55 MPa, a bulk density of 1.7 g/cm$^3$, and an apparent density of 3.1 g/cm$^3$, with the high-strength and medium-density range.

Further, the expandable water shutoff layer (2) is composed of the following ingredients by weight: 45% to 50% of acrylic acid, 45% to 50% of sodium hydroxide solution, 0.01% to 0.05% of N,N-methylenebisacrylamide, 1% to 2% of potassium persulfate solution, 1% to 2% of sodium carbonate solution, and 1% to 2% of sodium soil, and that the concentrations of sodium hydroxide solution, potassium persulfate solution and sodium carbonate solution are 5%.

Further, the water discharge and gas diversion layer (3) is composed of the following ingredients by weight: 40% to 45% of Cu[CH$_3$(CH$_2$)$_{10}$COO]$_2$, 30% to 35% of divinylsilane, 20% to 25% ethyl vinyl difluorosilane, and 3% to 5% hydrogen peroxide.

Further, the migration protection layer (4) is composed of the following ingredients by weight: 55.91% to 62.38% of dimethyl terephthalate and 37.62% to 44.09% of 1,4-butanediol.

Further, the suspension lift layer (5) is composed of the following ingredients by weight: 46% to 50% of acrylamide, 39% to 43% of acrylic acid, 6% to 10% of 2-acrylamido-2-methylpropanesulfonic acid, 2% to 4% of dimethylaminoethyl methacrylate, 0.1% to 1% of N, N-methylenebisacrylamide, and 0.1% to 1% of ammonium persulfate.

An application in fracturing construction with water-gas reservoir by using the intelligent water-control and gas-diversion particle for water-gas reservoirs is provided.

A preparation method of an intelligent water-control and gas-diversion particle for water-gas reservoirs, comprising the following steps:

Step 10: Preparing the ingredients in proportion, grinding them with grinding miller, then granulating them with casting mold, hardening the particles by solid state sintering method, and sieving out the particles of core support layer.

Step 20: Coating the particles of core support layer with an expandable water shutoff layer by spraying method, and drying them at room temperature.

The expandable water shutoff layer is prepared by the monomer polymerization method through mixing, polymerization, filming, drying, sieving and other steps.

Step 30: Preparing a solution for water discharge and gas diversion with 40% to 45% of $Cu[CH_3(CH_2)_{10}COO]_2$, 30% to 35% of divinylsilane, 20% to 25% ethyl vinyl difluorosilane, and 3% to 5% hydrogen peroxide by weight, spray the solution on the surface of the expandable water shutoff layer and the barbs of the core support layer, and cure them at room temperature to form a water discharge and gas diversion layer.

Step 40: Uniformly wrap the migration protection materials with spraying method until the barb is completely wrapped, and dry them at 50° C. to form a migration protection layer.

The migration protection material is a high-molecular polymer, polybutylene terephthalate, generated through the ester reaction at 200° C. and the polycondensation reaction at 255° C.

Step 50: Finally, coating the migration protection layer with a layer of high-molecular polymer, and then dry it to form a suspension lift layer.

Further, the expandable water shutoff layer and the suspension lift layer both have a thickness of 0.05 mm.

Further, the high-molecular polymer is prepared by adding initiator and high-efficiency cross-linking agent into and polymerizing water-swelling polymer.

The invention has the following beneficial effects: The invention not only solves the problem of proppant transportation and backflow in the fracturing process, has a significant effect on improving the water drainage and diversion capacity in the early and middle stages of exploitation of the oil and gas reservoirs and controlling the water outflow in the later stage.

DETAILED DESCRIPTION OF THE PREFERRED EMBODIMENTS

The present invention will be further described with the following embodiments and figures.

Embodiment 1

Figure 1:
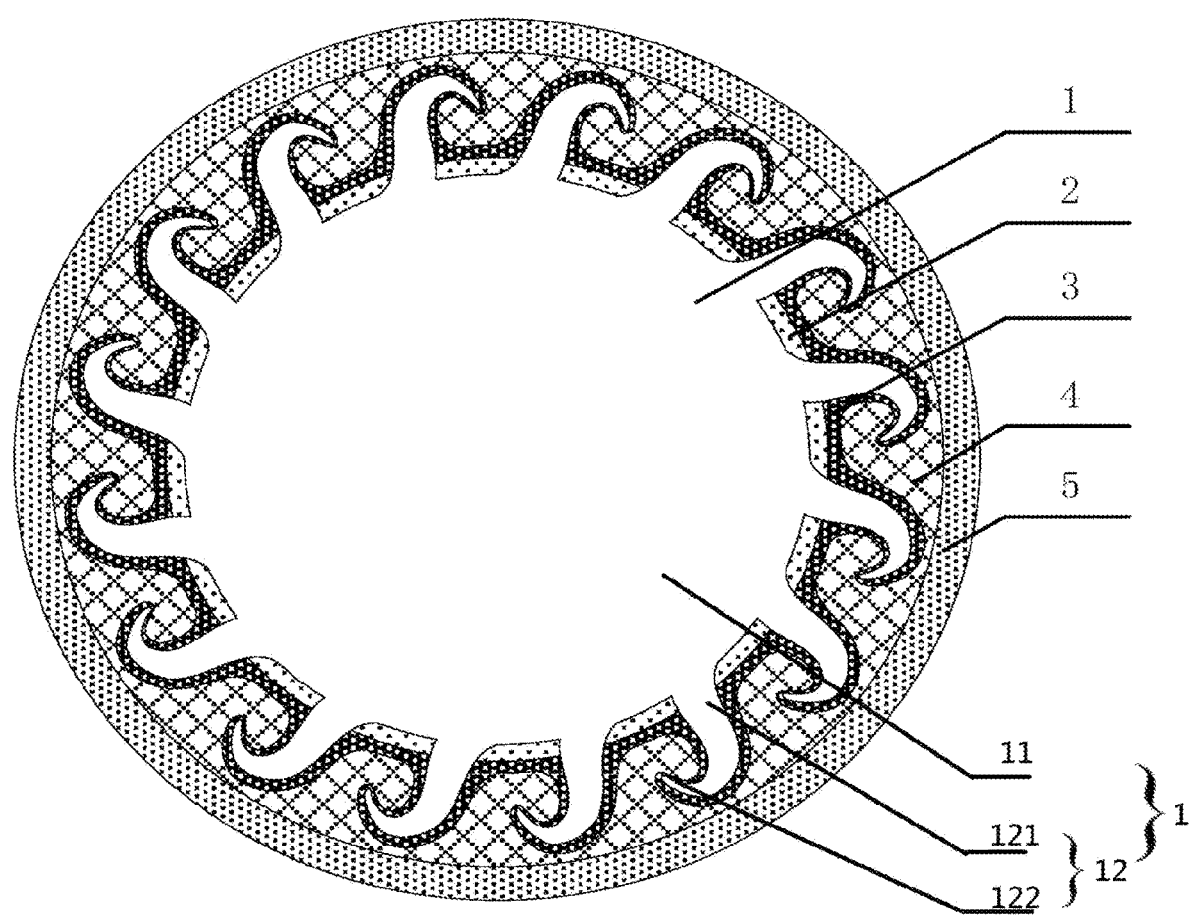
FIG. 1 is a schematic structure diagram of the present invention.

As shown in FIG. 1, an intelligent water-control and gas-diversion particle for water-gas reservoirs comprises core support layer 1, expandable water shutoff layer 2, water discharge and gas diversion layer 3, migration protection layer 4 and suspension lift layer 5. The core support layer 1 has a core body 11 and a plurality of barbs 12. The core body 11 is located at a center of the core support layer 1. The plurality of barbs 12 has a plurality of roots 121 located at a periphery of the core body 11 and a plurality of barbed terminals 122 extended outwards from the periphery of the core body 11. The expandable water shutoff layer 2 is wrapped on the outer surface of the core body 11 of the core support layer 1 and the plurality of roots 121 of the plurality of barbs 12; the water discharge and gas diversion layer 3 is wrapped on the outer surfaces of the expandable water shutoff layer 2 and the plurality of barbed terminals 122 of the plurality of barbs 12; the migration protection layer 4 is wrapped on the outer surface of the water discharge and gas diversion layer 3; the outer surface of the migration protection layer 4 forms a sphere; and the suspension lift layer 5 is wrapped on the outer surface of the migration protection layer 4.

The preparation method in Embodiment 1 comprises the following steps:

Step 10: Preparing a plurality of ingredients by weight: 65% of bauxite, 15% of silicon oxide, 13% of iron oxide, 5% of titanium oxide and 2% of aluminum fluoride, grinding them with grinding miller, then granulate them with casting mold, harden a plurality of particles by solid state sintering method, and sieve out a plurality of core support layers 1 of the plurality of particles; wherein each of the core support layers 1 has a core body 11 and a plurality of barbs 12, the core body 11 is located at a center of the core support layer 1, and the plurality of barbs 12 has a plurality of roots 121 located at a periphery of the core body 11 and a plurality of barbed terminals 122 extended outwards from the periphery of the core body 11.

Step 20: Coating the plurality of core support layers 1 of the plurality of particles of core support layer with a layer of expandable shutoff material by spraying method, drying them at room temperature to form an expandable shutoff layer; the expandable shutoff material is made from 50% of acrylic acid, 45% of 5% sodium hydroxide solution, 0.05% of N,N-methylenebisacrylamide, 2% of 5% potassium persulfate solution, 1% of 5% sodium carbonate solution, and 1.95% of sodium soil by weight through mixing, polymerization, filming, drying, sieving and other steps with monomer polymerization method. Thus, the expandable water shutoff layer 2 is wrapped on an outer surface of the core body 11 of the core support layer 1 and the plurality of roots 121 of the plurality of barbs 12.

Step 30: Preparing a solution for water discharge and gas diversion with 45% of $Cu[CH3(CH2)10COO]2$, 30% of divinylsilane, 20% ethyl vinyl difluorosilane, and 5% hydrogen peroxide by weight, spraying the solution on an outer surface of the expandable water shutoff layer and the plurality of barbed terminals of the plurality of barbs, and curing them at room temperature to form a water discharge and gas diversion layer.

Step 40: Making 55.91% of dimethyl terephthalate and 44.09% of 1,4-butanediol by weight subject to ester reaction at 200° C. and polycondensation reaction at 255° C. to generate polybutylene terephthalate (a high-molecular polymer), then adopt spraying method to uniformly wrap the particles with polybutylene terephthalate, and dry the particles at 50° C. to form a migration protection layer. Thus, the migration protection layer 4 is wrapped on an outer surface of the water discharge and gas diversion layer 3.

Step 50: Finally, coating the migration protection layer with a layer of high-molecular polymer prepared by adding initiator and high-efficiency cross-linking agent into and polymerizing water-swelling polymer which is obtained by quadripolymerizing 50% of acrylamide, 39% of acrylic acid, 6% of 2-acrylamido-2-methylpropanesulfonic acid, 4% of dimethylaminoethyl methacrylate, 0.5% of N,N-methylenebisacrylamide, and 0.5% of ammonium persulfate by weight, and then dry it to form a suspension lift layer.

Embodiment 2

As shown in FIG. 1, an intelligent water-control and gas-diversion particle for water-gas reservoirs comprises core support layer 1, expandable water shutoff layer 2, water discharge and gas diversion layer 3, migration protection layer 4 and suspension lift layer 5. The core support layer 1 has a core body 11 and a plurality of barbs 12. The core body 11 is located at a center of the core support layer 1. The plurality of barbs 12 has a plurality of roots 121 located at a periphery of the core body 11 and a plurality of barbed terminals 122 extended outwards from the periphery of the core body 11. The expandable water shutoff layer 2 is wrapped on the outer surface of the core body 11 of the core support layer 1 and the plurality of roots 121 of the plurality of barbs 12; the water discharge and gas diversion layer 3 is wrapped on the outer surfaces of the expandable water shutoff layer 2 and the plurality of barbed terminals 122 of the plurality of barbs 12; the migration protection layer 4 is wrapped on the outer surface of the water discharge and gas diversion layer 3; the outer surface of the migration protection layer 4 forms a sphere; and the suspension lift layer 5 is wrapped on the outer surface of the migration protection layer 4.

The preparation method in Embodiment 2 comprises the following steps:

Step 10: Preparing a plurality of ingredients by weight: 67% of bauxite, 13% of silicon oxide, 12% of iron oxide, 5% of titanium oxide and 3% of aluminum fluoride, grinding them with grinding miller, then granulating them with casting mold, hardening a plurality of particles by solid state sintering method, and sieving out a plurality of core support layers 1 of the plurality of particles. Each of the core support layers 1 has a core body 11 and a plurality of barbs 12, the core body 11 is located at a center of the core support layer 1, and the plurality of barbs 12 has a plurality of roots 121 located at a periphery of the core body 11 and a plurality of barbed terminals 122 extended outwards from the periphery of the core body 11.

Step 20: Coating the plurality of core support layers 1 of the plurality of particles of core support layer with a layer of expandable shutoff material by spraying method, drying them at room temperature to form an expandable shutoff layer; the expandable shutoff material is made from 47% of acrylic acid, 48% of 5% sodium hydroxide solution, 0.05% of N,N-methylenebisacrylamide, 1% of 5% potassium persulfate solution, 2% of 5% sodium carbonate solution, and 1.95% of sodium soil by weight through mixing, polymerization, filming, drying, sieving and other steps with monomer polymerization method. Thus, the expandable water shutoff layer 2 is wrapped on an outer surface of the core body 11 of the core support layer 1 and the plurality of roots 121 of the plurality of barbs 12.

Step 30: Preparing a solution for water discharge and gas diversion with 42% of $Cu[CH_3(CH_2)_{10}COO]_2$, 33% of divinylsilane, 21% ethyl vinyl difluorosilane, and 4% hydrogen peroxide by weight, spraying the solution on an outer surface of the expandable water shutoff layer and the plurality of barbed terminals of the plurality of barbs, and curing them at room temperature to form a water discharge and gas diversion layer.

Step 40: Making 60% of dimethyl terephthalate and 40% of 1,4-butanediol by weight subject to ester reaction at 200° C. and polycondensation reaction at 255° C. to generate polybutylene terephthalate (a high-molecular polymer), then adopting spraying method to uniformly wrap the particles with polybutylene terephthalate the barb is completely wrapped, and drying the particles at 50° C. to form a migration protection layer. Thus, the migration protection layer 4 is wrapped on an outer surface of the water discharge and gas diversion layer 3.

Step 50: Finally, coating the migration protection layer with a layer of high-molecular polymer prepared by adding initiator and high-efficiency cross-linking agent into and polymerizing water-swelling polymer which is obtained by quadripolymerizing 48% of acrylamide, 42% of acrylic acid, 7% of 2-acrylamido-2-methylpropanesulfonic acid, 2% of dimethylaminoethyl methacrylate, 0.4% of N,N-methylenebisacrylamide, and 0.6% of ammonium persulfate by weight, and then dry it to form a suspension lift layer.

In the application of the particles prepared in the embodiments 1 and 2 respectively in the fracturing of gas reservoir with aquifer, the suspension lift layer 5 of the particles first contacted with water and the polymer rapidly swelled, forming a relatively stable hydration layer around the particles and filling the gap between the proppant particles, so that the particles could be suspended well and evenly distributed in the fracturing fluid. Moreover, the particles could flow with the hydraulic fracturing under their lifting effect, without sedimentation and separation. After the particles were delivered to the designated location, gel breaker could be injected to release the proppant.

As the migration protection layer 4 is insoluble in organic solvent, it can be hydrolyzed after being soaked in hot water above 52° C. for a long time to ensure that the barbs of the core support layer will not be exposed in advance in the process of fracturing. After arriving at the formation, the migration protection layer 4 is hydrolyzed in high-temperature water to expose the barbs of the core support layer 1.

When the barbs of the core support layer 1 are exposed, the barbs of adjacent particles make them connected with each other, and some barbs are embedded into the formation under the pressure, stabilizing the fractures, preventing the backflow of proppant and maintaining a high diversion capacity.

The outermost layer of particles is water discharge and gas diversion layer 3 which has a good diversion capacity when the water yield is low in the early and middle stages of exploitation of gas reservoir with aquifer. The water discharge and gas diversion layer 3 also coordinates with the operation of oil pipe to drain the formation fluid out of the wellhead, effectively reducing fluid accumulated near well bottom due to "water invasion", "water lock", "water-sensitive mineral swelling", etc. in the gas reservoir, and obtaining a higher production rate and recovery efficiency.

In the gas reservoir with aquifer, due to heterogeneous permeability in horizontal and vertical direction in the formation, formation water will infiltrate into the borehole along the high-permeability interlayer and fractures, resulting in water outflow in gas well and, in severe cases, flooding in oil well. In case of heavy water output, the water discharge and gas diversion layer 3, which is enclosed outside the expandable water-shutoff layer 2, is washed away, then the expandable water-shutoff layer 2 expands rapidly in fissures to block them and prevent water flowing into the wellbore, thereby realizing profile control and water shutoff.

Figure 2:
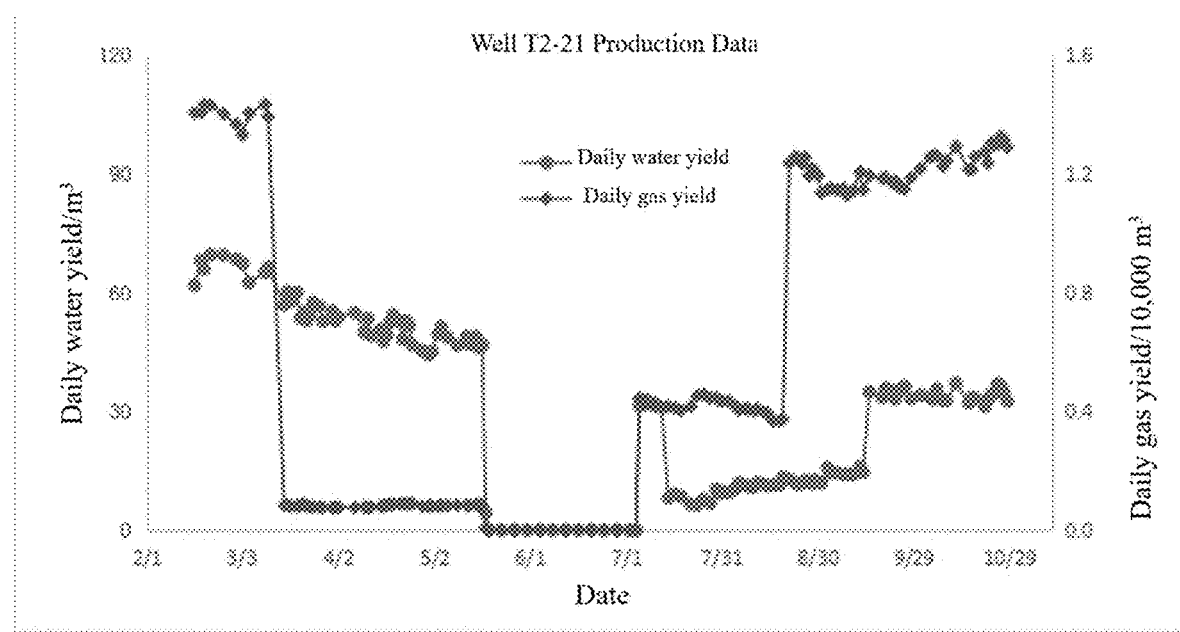
FIG. 2 is a construction data chart.

As shown in FIG. 2, the particles prepared in the embodiments were used for the construction of Well T2-21. It can be seen from the production data that in the period from Mar. 12, 2019 to May 18, 2019 the average daily gas yield of Well T2-21 was 0.08,000 m³/day and the average daily water yield was 51 m³/day. It is a water-locked gas well. In order to restore the water-yielding capacity of gas well, the well was closed for 46-day fracturing with pre-coated sand on May 19. After the well was opened for production on July 4, the water yield decreased significantly on the third day and the gas yield returned to normal level, indicating that the formation water near the well had been drained and the water discharge and gas discharge of the formation was greatly improved.

The above are not intended to limit the present invention in any form. Although the present invention has been disclosed as above with embodiments, it is not intended to limit the present invention. Those skilled in the art, within the scope of the technical solution of the present invention, can use the disclosed technical content to make a few changes or modify the equivalent embodiment with equivalent changes. Within the scope of the technical solution of the present invention, any simple modification, equivalent change and modification made to the above embodiments according to the technical essence of the present invention are still regarded as a part of the technical solution of the present invention.

What is claimed is:

1. An intelligent water-control and gas-diversion particle for water-gas reservoirs, comprising:
    a core support layer having a core body and a plurality of barbs, an expandable water shutoff layer, a water discharge and gas diversion layer, a migration protection layer and a suspension lift layer; wherein the core body is located at a center of the core support layer, and the plurality of barbs has a plurality of roots located at a periphery of the core body and a plurality of barbed terminals extended outwards from the periphery of the core body, wherein the expandable water shutoff layer is wrapped on an outer surface of the core body of the core support layer and the plurality of roots of the plurality of barbs; the water discharge and gas diversion layer is wrapped on outer surfaces of the expandable water shutoff layer and the plurality of barbed terminals of the plurality of barbs; the migration protection layer is wrapped on an outer surface of the water discharge and gas diversion layer; an outer surface of the migration protection layer forms a sphere; and the suspension lift layer is wrapped on an outer surface of the migration protection layer.

2. The intelligent water-control and gas-diversion particle for water-gas reservoirs according to claim 1, wherein the core support layer is composed of the following ingredients by weight: 65% to 70% of bauxite, 12% to 15% of silicon oxide, 10% to 13% of iron oxide, 3% to 5% of titanium oxide, and 2 to 4% of alumina.

3. The intelligent water-control and gas-diversion particle for water-gas reservoirs according to claim 2, wherein the expandable water shutoff layer is composed of the following ingredients by weight: 45% to 50% of acrylic acid, 45% to 50% of sodium hydroxide solution, 0.01% to 0.05% of N,N-methylenebisacrylamide, 1% to 2% of potassium persulfate solution, 1% to 2% of sodium carbonate solution, and 1% to 2% of sodium soil, and that the concentrations of sodium hydroxide solution, potassium persulfate solution and sodium carbonate solution are 5%.

4. The intelligent water-control and gas-diversion particle for water-gas reservoirs according to claim 3, wherein the water discharge and gas diversion layer is composed of the following ingredients by weight: 40% to 45% of Cu[CH3(CH2)10COO]2, 30% to 35% of divinylsilane, 20% to 25% ethyl vinyl difluorosilane, and 3% to 5% hydrogen peroxide.

5. The intelligent water-control and gas-diversion particle for water-gas reservoirs according to claim 4, wherein the migration protection layer is composed of the following ingredients by weight: 55.91% to 62.38% of dimethyl terephthalate and 37.62% to 44.09% of 1,4-butanediol.

6. The intelligent water-control and gas-diversion particle for water-gas reservoirs according to claim 5, wherein the suspension lift layer is composed of the following ingredients by weight: 46% to 50% of acrylamide, 39% to 43% of acrylic acid, 6% to 10% of 2-acrylamido-2-methylpropanesulfonic acid, 2% to 4% of dimethylaminoethyl methacrylate, 0.1% to 1% of N, N-methylenebisacrylamide, and 0.1% to 1% of ammonium persulfate.

7. A preparation method of an intelligent water-control and gas-diversion particle for water-gas reservoirs, comprising the following steps:
    Step 1: preparing a plurality of ingredients in proportion, grinding them with grinding miller, then granulating them with casting mold, hardening a plurality of particles by solid state sintering method, and sieving out a plurality of core support layers of the plurality of particles, wherein each of the core support layers has a core body and a plurality of barbs, the core body is located at a center of the core support layer, and the plurality of barbs has a plurality of roots located at a periphery of the core body and a plurality of barbed terminals extended outwards from the periphery of the core body;
    Step 2: coating the plurality of core support layers of the plurality of particles with an expandable water shutoff layer by spraying method, and drying them at room temperature, such that the expandable water shutoff layer is wrapped on an outer surface of the core body of the core support layer and the plurality of roots of the plurality of barbs;
    Step 3: preparing a solution for water discharge and gas diversion with 40% to 45% of Cu[CH3(CH2)10COO]2, 30% to 35% of divinylsilane, 20% to 25% ethyl vinyl difluorosilane, and 3% to 5% hydrogen peroxide by weight, spraying the solution on an outer surface of the expandable water shutoff layer and the plurality of barbed terminals of the plurality of barbs, and curing them at room temperature to form a water discharge and gas diversion layer;
    Step 4: uniformly wrapping migration protection materials with spraying method and drying them at 50° C. to form a migration protection layer, such that the migration protection layer is wrapped on an outer surface of the water discharge and gas diversion layer; and
    Step 5: finally, coating the migration protection layer with a layer of high-molecular polymer, and then drying it to form a suspension lift layer.

8. The preparation method of an intelligent water-control and gas-diversion particle for water-gas reservoirs according to claim 7, wherein the expandable water shutoff layer and the suspension lift layer both have a thickness of 0.05 mm.

9. The preparation method of an intelligent water-control and gas-diversion particle for water-gas reservoirs according to claim 7, wherein the high-molecular polymer is prepared by adding initiator and high-efficiency cross-linking agent into and polymerizing water-swelling polymer.

* * * * *